Jan. 18, 1938.  G. D. LONG  2,106,055
HAND SCRAPER
Filed March 5, 1936
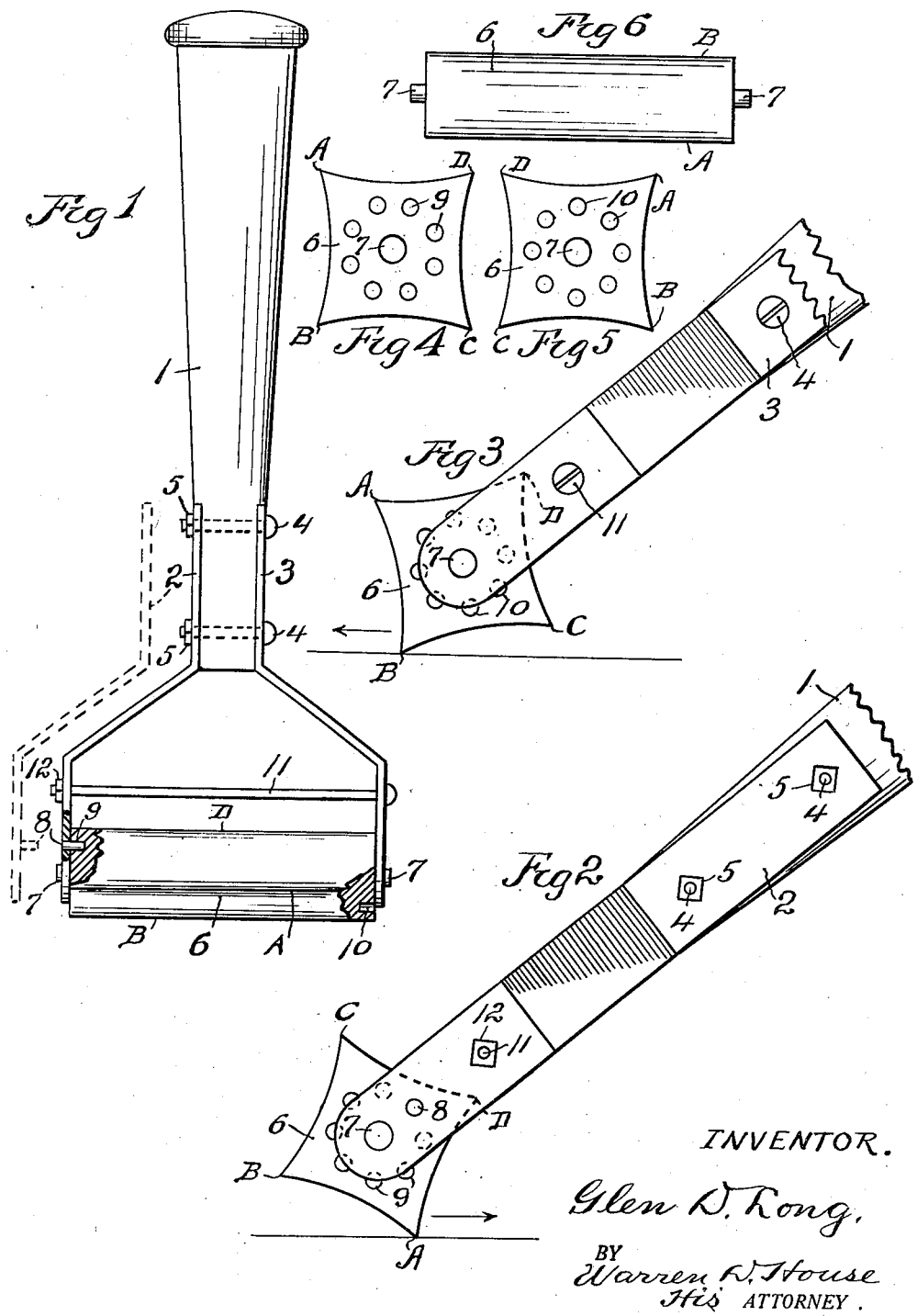
INVENTOR.
Glen D. Long.
BY Warren D. House
His ATTORNEY.

Patented Jan. 18, 1938

2,106,055

UNITED STATES PATENT OFFICE 2,106,055

HAND SCRAPER

Glen D. Long, Kansas City, Mo.

Application March 5, 1936, Serial No. 67,233

3 Claims. (Cl. 30—169)

My invention relates to improvements in hand scrapers.

One of the objects of my invention is the provision of a novel scraper of the kind described which can be easily and readily used for pushing or pulling scraping.

A further object of my invention is the provision of a novel scraper blade.

Another object of my invention is the provision in a hand scraper having a handle of a blade having a cutting edge and adjustable to different positions in which the blade will be disposed at different angles to the longitudinal axis of the handle.

Another object of my invention is the provision of novel means for releasably holding the blade in the positions to which it is adjusted.

Still another object of my invention is the provision of a novel hand scraper, adapted for scraping meat chopping blocks, floors and the like, which is simple, cheap, strong, durable, not likely to get out of order, and which is effective in its operation.

The novel features of my invention are hereinafter fully described and claimed.

In the accompanying drawing, which illustrates the preferred embodiment of my invention, Fig. 1 is a plan view, partly in section, of my improved hand scraper.

Fig. 2 is an enlarged side elevation, partly broken away, of the scraper.

Fig. 3 is a view similar to Fig. 2, but in a position the reverse of that shown in Fig. 2.

Fig. 4 is an enlarged view of one end of the blade.

Fig. 5 is a similar view of the opposite end of the blade.

Fig. 6 is a plan view of the blade detached.

Similar characters of reference designate similar parts in the different views.

The handle is provided with a body 1 to opposite sides of which are releasably fastened two arms 2 and 3, which diverge forwardly from the front end of the body 1, and then extend forwardly parallel with each other. For fastening the arms, two bolts 4 extend through the body 1 and the arms 2 and 3 and are respectively provided with removable nuts 5 which bear against the arm 2, and which, when removed, permit the detachment of the arm 2, as indicated in dotted lines in Fig. 1.

Disposed lengthwise and circumferentially revoluble between the arms 2 and 3 is a scraping blade 6 having at its respective ends axial trunnions 7 respectively extending through and revoluble in the arms 2 and 3 adjacent to the forward ends thereof.

The blade 6 has a plurality of concave sides, preferably four, as shown, each adjacent pair of which at their intersections forms cutting edges parallel with each other and the axis of the blade. The blade shown is substantially of the form of a rectangular prism, and in cross section has substantially the form of a square with concave sides meeting at the corners to form symmetrical cusps, which projected longitudinally constitute four cutting edges A, B, C and D circumferentially equally spaced and disposed parallel with the axis of the blade 6 and with each other.

The blade 6 is made revolvably adjustable, about its longitudinal axis, on the handle, so that each cutting edge may be disposed in different positions with relation to the surface which is being scraped, without changing the inclination of the longitudinal axis of the handle.

With the provision of a plurality of cutting edges, as described, the blade 6 is adapted for use by either pulling or pushing, without changing the position of the blade in the handle and without altering the angle of inclination of the handle. Thus, as shown in Fig. 3, the cutting edge B is in proper position for scraping a flat surface by being pushed in the direction indicated by the arrow.

Upon axially revolving the handle so that its sides are reversed, the cutting edge A is disposed in a proper position for scraping by drawing or pulling in the direction indicated by the arrow.

By circumferentially revolubly adjusting the blade 6 between the arms 2 and 3, each cutting edge can be employed in scraping, and can be disposed in a large number of different positions with respect to the surface that is to be scraped.

For releasably locking the blade 6 in such positions as it may be disposed, there is mounted in the arm 2 a locking pin 8 which is parallel with but eccentric to the axis of the blade 6, and which extends inwardly from the arm 2 and is adapted to be inserted into and fit any one of a circularly arranged row of holes 9 in the adjacent end of the blade 6, as shown in Figs. 1 and 2. The holes 9 are arranged concentrically around the axis of the blade 6 at the same radial distance from the axis as the pin 8.

The other end of the blade 6 is also provided with circularly arranged holes 10, disposed circumferentially in staggered relation to the holes 9, or so as to alternate therewith, as can be seen by comparing Figs. 4 and 5.

The arms 2 and 3 are of resilient material, and the arms may be sprung apart, without detachment from the body 1, enough to permit the removal of the blade 6, so that it may be reversed end for end and thus replaced in operative condition in the handle with the holes 10 adapted to receive the locking pin 8.

The staggered relationship between the holes 9 and 10 affords fine adjustments circumferentially to be made.

For releasably holding the arms 2 and 3 from spreading apart during rough usage, a bolt 11 is removably extended through the arms 2 and 3 parallel with the axis of the blade 6 and at the inner side thereof, as shown in Figs. 1, 2, and 3. Removably mounted on the bolt 11 is a nut 12 which bears against the outer side of the arm 2. The head of the bolt bears against the outer side of the arm 3.

In the operation of the scraper, the blade 6 is circumferentially adjusted to such position on the handle, as may best suit the particular work in hand, and to best suit the position in which the operator is to hold the handle, the adjustment being made in the manner already described. As has been described, the blade may be adjusted so as to be used for push or pull scraping by simply axially reversing the sides of the handle with respect to the surface to be scraped.

In the form of blade shown adjacent cutting edges, as A and B, are respectively in longitudinal radial planes at right angles to each other.

Modifications of my invention within the scope of the appended claims, may be made without departing from its spirit.

What I claim is:—

1. A hand scraper having a handle provided with two arms, a blade between and rotatably mounted at its opposite ends on said arms, whereby said blade may be rotatably adjusted to different positions, said blade having a cutting edge parallel with the axis of said blade, the latter having in each end holes arranged in a circle concentric with said axis and in staggered relation to the holes in the other end, said blade being endwise reversible between said arms, and a locking pin extending inwardly from one of said arms and adapted to enter any one of said holes in the adjacent end to hold the blade from turning in either direction.

2. A hand scraper having a handle, a blade of substantially the form of a rectangular prism rotatably adjustable about its longitudinal axis on said handle and being in cross-section substantially rectangular with concave sides meeting at the corners to form symmetrical cusps which projected longitudinally constitute cutting edges, the blade having at its ends axial trunnions supported by the handle and on which it is adapted for rotation, and means for releasably locking said blade from rotation in either direction from different positions to which it may be rotatably adjusted.

3. A hand scraper having a handle, a blade of substantially the form of a rectangular prism and having at its ends axial trunnions on which it is adapted for rotation on said handle and being in cross-section substantially rectangular with concave sides meeting at the corners to form symmetrical cusps which projected longitudinally constitute cutting edges, the blade having in one end holes arranged in a circle concentric with the axis of the blade, and a locking pin carried by the handle and adapted to be removably inserted into any one of said holes and when therein holding said blade from rotation in either direction.

GLEN D. LONG.